(12) United States Patent
Pan et al.

(10) Patent No.: US 8,220,022 B1
(45) Date of Patent: *Jul. 10, 2012

(54) TRAVERSING VIDEO RECOMMENDATIONS

(75) Inventors: Yu Pan, San Francisco, CA (US); Jasson Schrock, Mountain View, CA (US)

(73) Assignee: Google Inc., Mountain View, CA (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/193,749

(22) Filed: Aug. 19, 2008

Related U.S. Application Data

(63) Continuation-in-part of application No. 11/955,298, filed on Dec. 12, 2007, now Pat. No. 7,966,632.

(51) Int. Cl.
*H04N 5/445* (2011.01)
*G06F 3/00* (2006.01)
*G06F 13/00* (2006.01)
(52) U.S. Cl. .............................. 725/46; 725/45; 725/47
(58) Field of Classification Search .............. 725/39–40, 725/43–49
See application file for complete search history.

(56) References Cited

U.S. PATENT DOCUMENTS

| 7,966,632 B1 * | 6/2011 | Pan et al. ................. 725/46 |
| 2009/0006397 A1 * | 1/2009 | Lehtiniemi et al. .......... 707/7 |

OTHER PUBLICATIONS

Abhinandan Das; Mayur Datar; Ashutosh Garg and Shyam Rajaram—Google News Personalization:Scalable Online Collaborative Filtering (WWW 2007, May 8-12, 2007, Banff, Alberta, Canada. ACM 978-1-59593-654-07/07/0005).*

Toshiba—Satellite A55 Series User's Guide—Aug. 2004 (p. 210-212).*

* cited by examiner

*Primary Examiner* — Hai V Tran
(74) *Attorney, Agent, or Firm* — Fenwick & West LLP

(57) ABSTRACT

A system, method and various user interfaces facilitate traversing multiple groups of video recommendations. A group of video recommendations includes a central video, an indicator of video of interest corresponding to the central video, and a set of related videos displayed at its corresponding display distance from the central video and from each other. The corresponding display distance of a video is calculated as a function of the video's recommendation score and correlation with other videos of the group. Responsive to selection of new central video, a new group of video recommendations is generated and displayed in coordination of the existing groups of video recommendations, where the plurality of central videos are visually connected. Visually presenting recommended videos responsive to user selections of videos of interest provides a quick and intuitive way for user to traverse videos of interest and visualize the browsing of the recommended videos.

28 Claims, 12 Drawing Sheets

TRAVERSING VIDEO RECOMMENDATIONS

TECHNICAL FIELD

The described embodiments of the present invention relate generally to web-based video searching, and specifically to searching video repositories in an online video content distribution system.

BACKGROUND

The expansion of the Internet and the World Wide Web has enabled computer users to explore media in various different forms and in various different ways. Video content sharing on websites has developed into a worldwide phenomenon, supported by many websites. On average, over 10,000 videos are posted every day, and this number is increasing as the tools and opportunities for capturing video become easy to use and more widespread. The vastness of a video repository hosted by a video hosting website causes users to rely on search engines as one way to retrieve videos of interest.

A typical search engine takes user input in forms of search terms or keywords, searches through a video database to find videos that match the user's query and returns search results. For example, if videos are transcribed or otherwise labeled with text, text retrieval techniques can be used to locate videos of interest for users. Other video retrieval methods, such as content-based queries and metadata queries, can be used to find videos that match the user's search terms.

Many conventional formats for presenting search results use a list of links, URLs, or thumbnails. Each individual link in the list represents a video that satisfies the user's query, and points to a location where the video is stored in the video database. However, even the search results generated by the most sophisticated video content analysis will be of little value unless it can be presented in an easy and appealing manner for a user to consume the results. For example, due to the vastness of a video repository hosted by a video hosting website, some search results often contain a long list of links, and a user is not able to visually see whether a video found by the search engine truly contains the relevant content without actually playing the video. Compounding this, a long list of links does not provide a visual presentation of the correlation among the videos in the list.

SUMMARY

The embodiments of the present invention facilitate user traversing a plurality of video recommendations in a quick and intuitive way, including a method, system, and computer program product that receives a command from a client computer requesting a service of visually browsing multiple groups of video recommendations and provides the requested service to the client computer while keeps tracking of user selections of videos of interest. A method in accordance with an embodiment of the invention includes displaying a first group of video recommendations, receiving from a client computer a selection of a central video, generating a new group of video recommendations in response to the client selection and visually displaying multiple groups of video recommendations to the client, where the central videos of the plurality of video recommendations are visually connected. To capture user selections of videos of interest over a period of time, the method further includes displaying a plurality of indications of videos of interest corresponding to the user selections of videos of interest. The method in accordance with an embodiment of the invention allows a user to traverse a plurality of groups of video recommendations. Responsive to user traversing the video recommendations, the method further includes adjusting the visual display of the plurality of groups of video recommendations in a display area.

A system in accordance with an embodiment includes a visual video browsing server, and a visual presentation module and a recommendation module executed by the visual browsing server. The visual presentation module monitors user events associated with multiple groups of video recommendations including user selections of videos of interest. The visual presentation module further coordinates visual display of a plurality of video recommendations groups in a display area responsive to user selections of videos of interest over a period of time. The recommendation module generates a group of video recommendations based on the client selection of a central video, including relating a set of videos of a group related to a central video of the group using a weighted covisitation measure, generating a recommendation score of a video based on its weighted covisitation score, relating a video of the group to another video of the group, and generating an indicator of video of interest corresponding to the client selection of the central video. Responsive to the client selection of a new central video, the visual presentation module further displays a visual connection between the new central video and the previous central video.

A computer program product for facilitating user traversing a plurality of groups of video recommendations in one embodiment includes computer program code stored in a computer-readable medium for receiving a selection of a central video from a group of video recommendations from a client computer, computer program code for generating a group of video recommendations in response to the client selection and displaying multiple groups of video recommendations in a display area while keeping track of user selections of videos of interest.

The features and advantages described in this summary and the following detailed description are not all-inclusive. Many additional features and advantages will be apparent to one of ordinary skill in the art in view of the drawings, specification, and claims hereof

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

The Figures and descriptions of the present invention have been simplified to illustrate elements that are relevant for a clear understanding of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
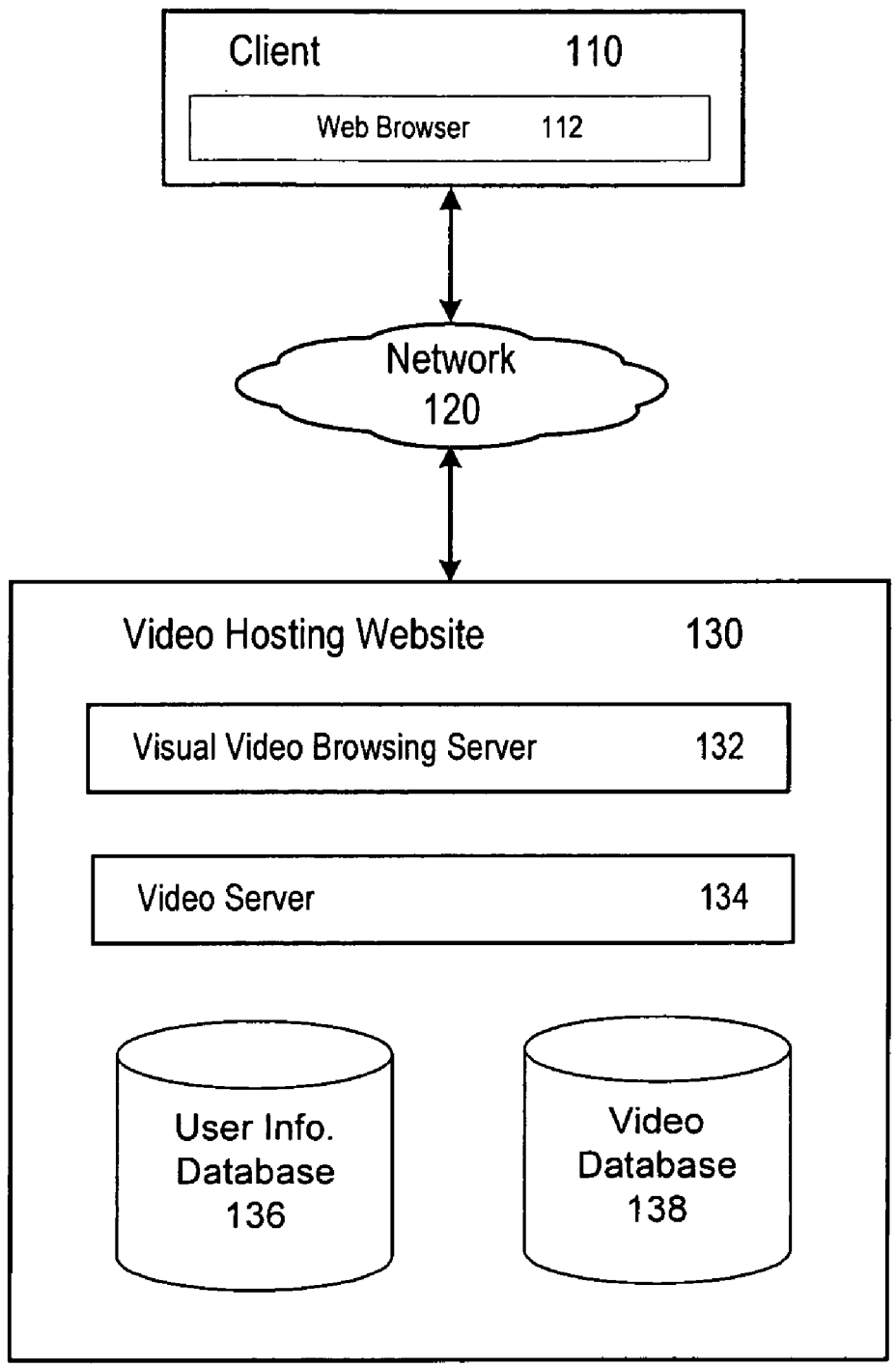
FIG. 1 is a block diagram of a system architecture for providing a visual presentation of video recommendations according to one embodiment.

FIG. 1 is a block diagram of a system architecture 100 for providing visual presentation of browsing video recommendations according to one embodiment. As shown in FIG. 1, a client 110 is connected to a video hosting website 130 via a computer network 120. The client 110 executes a web browser 112. The video hosting website 130 comprises a visual video browsing server 132, a video server 134, a user information database 136 and a video database 138. Many conventional features, such as firewalls, load balancers, application servers, failover servers, site management tools, and so forth are not shown so as to more clearly illustrate the features of the system.

The client 110 communicates with the video hosting website 130 via the computer network 120. The client 110 can be a personal computer (PC) in one embodiment, or a mobile handset or other electronic computing devices in other embodiments. While only a single client 110 and web browser 112 are shown, it is understood that very large numbers (e.g., thousands or more) of clients are supported and can be in communication with the website 130 at any time. In some embodiments, the browser 112 uses a third party video player (e.g., the Flash™ player from Adobe Systems, Inc.), or any other player adapted for the video file formats used on the site 130. Typically, a user accesses a video from the site 130 by browsing a catalog of videos, conducting searches on keywords, reviewing playlists from other users or the system administrator (e.g., collections of videos forming channels), or viewing videos associated with particular user groups (e.g., communities). In some embodiments, browser 112 also accesses a video file indirectly, via an embedded video that is accessed via an embedded hyperlink in a third party website.

Users of the client 110 and browser 112 can upload content (which can include, for example, video, audio, or still images, or a combination of video and audio and still images) to the site 130 and browse media content stored at the site 130 via the network 120. The uploaded content is processed and placed for storage in the video database 138. This processing can include format conversion, compression, metadata tagging, and other data processing. In some embodiments, an uploaded content file is associated with the uploading user, and so the user's account record is updated in the user information database 136 as needed. In some embodiments, other data relating to the user is also placed for storage in database 136. For example, in one embodiment, a list of videos that have been viewed by the user over the last ten days is associated with a user ID and is kept in the user information database 136.

The network 120 enables communications among the client 110 and the video hosting website 130. In one embodiment, the network 120 uses standard communications technologies and/or protocols. Thus, the network 120 can include links using technologies such as Ethernet, 802.11, integrated services digital network (ISDN), digital subscriber line (DSL), asynchronous transfer mode (ATM), etc. The network 120 may also support mobile access using technologies such as Wideband Code Division Multiple Access (W-CDMA), CDMA200, Global System for Mobile Communications (GSM), General Packet Radio Service (GPRS), or similar technologies. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above.

For purposes of convenience and the description of one embodiment, the media content uploaded and browsed by a user will be referred to a "videos" or "video files", but no limitation on the types of media content that can be uploaded and browsed are intended by this terminology.

The video hosting website 130 allows users to upload videos to the website 130 and browse the videos stored in the website 130. A suitable website 130 for implementation of the system is the YOUTUBE™ website, found at www.youtube.com; other video hosting sites are known as well, and can be adapted to operate according the teaching disclosed herein. The various servers are conventionally implemented, whether as a single piece of software or hardware or as multiple pieces of software or hardware. In general, functions described in one embodiment as being performed on the server side can also be performed on the client side in other embodiments if appropriate.

The visual video browsing server 132 provides an intuitive way for users to quickly visualize and browse of videos of interest. The visual video browsing server 132 monitors user interface events, generates video recommendations and visually displays the recommendations to users via a display. The visual video browsing server 132 displays the recommended videos in orbit around a central video, i.e., the current focus of interest, with the video most recommended for the central video being the closest in the display. When a user changes his/her focus of interest to another video, the visual video browsing server 132 regenerates the recommendations around the new focus of interest, and visually displays the newly generated recommendations in the display 218. The initial recommendations are kept on the screen so that user can easily and quickly scroll back to them. As such, video browsing becomes "live" such that a user can not only visually see a single browsing process of a group of recommendations, but also visualize multiple video browsing processes in the same display area. Further detail on visually displaying the video recommendations is presented in connection with the discussion of FIG. 5.

Figure 2:
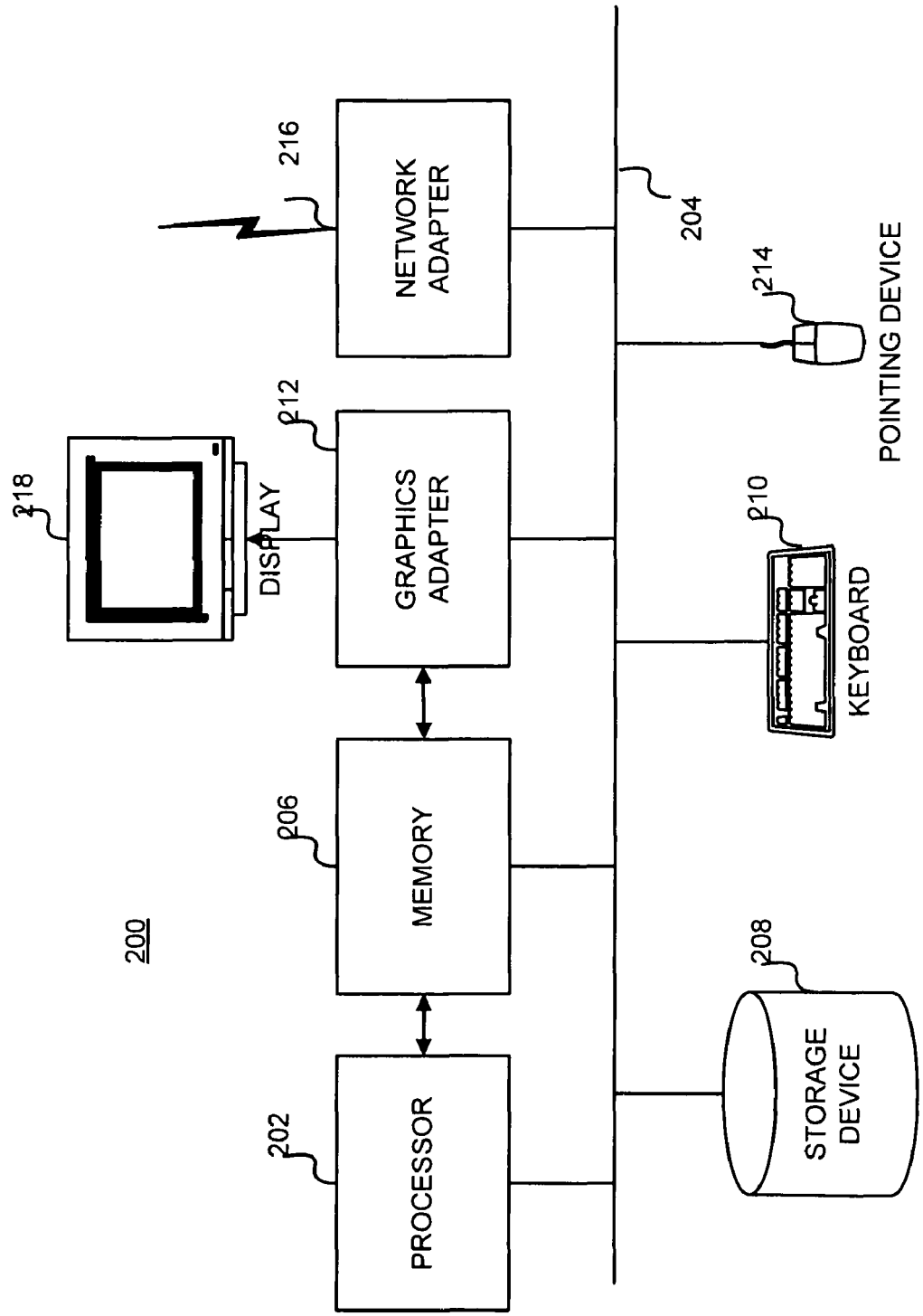
FIG. 2 is a block diagram of a client computer for browsing videos on a video server according to one embodiment.

FIG. 2 is a high-level block diagram of a computer 200 for acting as a client 110, a visual video browsing server 132, a video server 134 and managers of user information database 136 and video database 138 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a server 116 can lack a keyboard 210, pointing device 214, graphics adapter 212, and/or display 218. Moreover, the storage device 208 can be local and/or remote from the computer 200 (such as embodied within a storage area network (SAN)).

Figure 5:
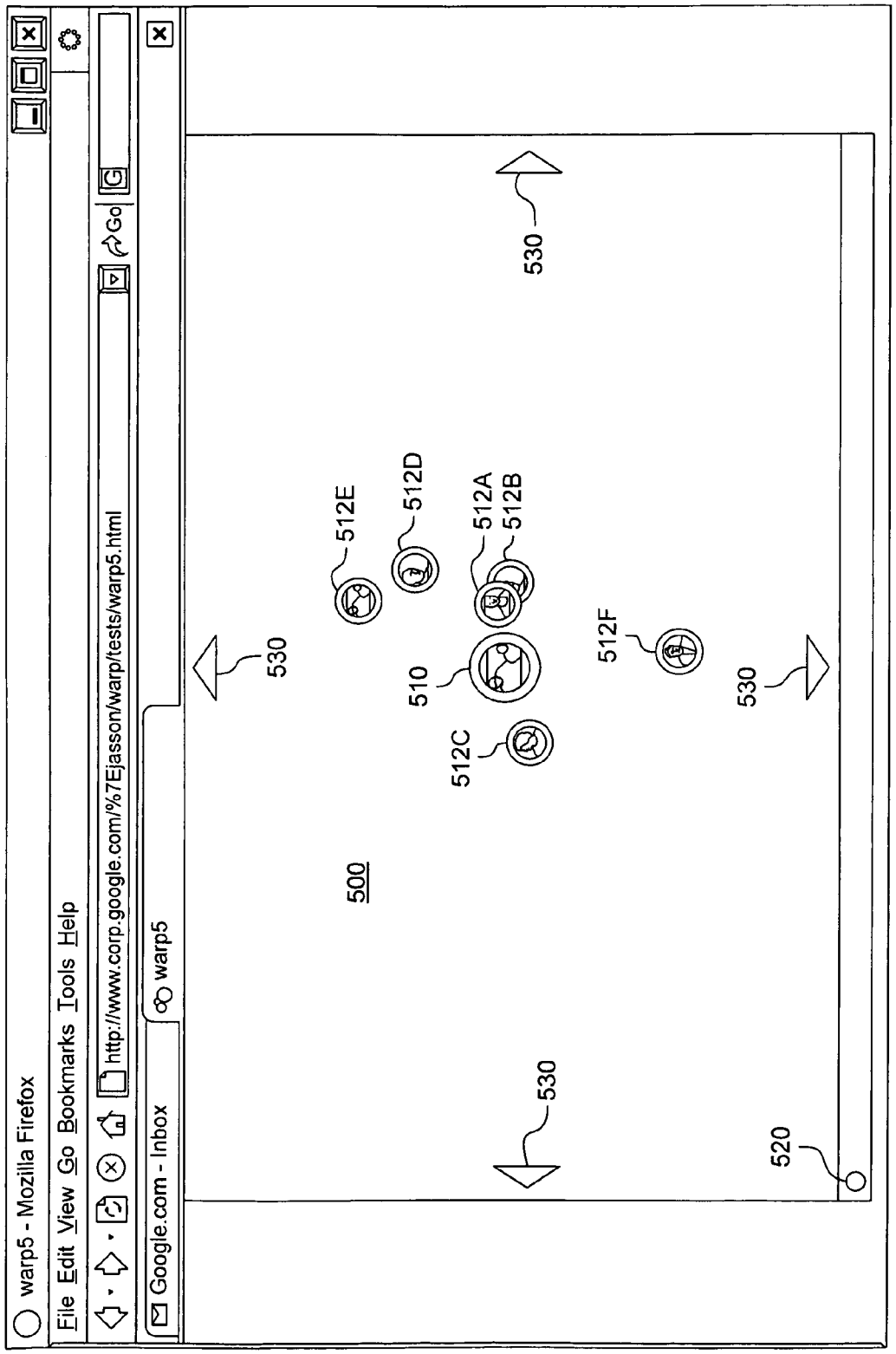
FIG. 5 illustrates a web page implementing an exemplary interface for visually presenting a single group of video recommendations in a display area according to one embodiment.

Referring now to FIG. 5, an exemplary interface for visually presenting a single group of video recommendations is illustrated according to one embodiment. The exemplary interface includes a video recommendation browsing/display window 500, a group of video recommendations including a central video 510, directional display controls 530 and a type of service indication 520 (in this case, it is a video browsing service). The video recommendation browsing window 500 is already, in the illustrated case, displaying a group of videos recommended by a recommendation engine. The relative correlation among the recommended videos is also visually displayed.

More specifically, in the illustrated case a total of seven videos are recommended and each recommended video is represented by a video icon. In one embodiment, the video icon is a thumbnail image of a key frame to give an overview of the visual content in the recommended video. A relatively large video icon of the current central video 510 is displayed in the center of the display window 500. Six more smaller video icons, 512A-512F, each of which represents a recommended video 512 related to the central video 510, are displayed surrounding the central video 510 at its respective distance from the central video 510. For purposes of convenience and the description of one embodiment, the recommended videos 512 related to the central video 510 will be referred to below as an "orbiting videos" of the central video 510. For each orbiting video 512 of the central video 510, its displayed distance from the central video 510 represents a probability of being watched next given the current central video 510 being watched further influenced by its correlation to other orbiting videos 512. For example, the orbiting video 512A, which is closest in distance to the central video 510, is most likely to be watched next by this user among other orbiting videos 512 based on factors discussed further below. As such, the relativeness of each orbiting video 512 to the central video 510 is visually displayed in terms of its physical distance from the central video 510 in the display window 500. At the same time, the relative correlation between each orbiting video 512 is also visually displayed in terms of the relative distance towards each other. Each orbiting video 512 has a probability of being watched next given the central video 510 being watched. Such conditional probability associated with each orbiting video 512 is calculated by the recommendation engine 320 of the visual video browsing server 132. Further detail on generating video recommendations is presented in connection with the discussion of FIG. 3.

Figure 3:
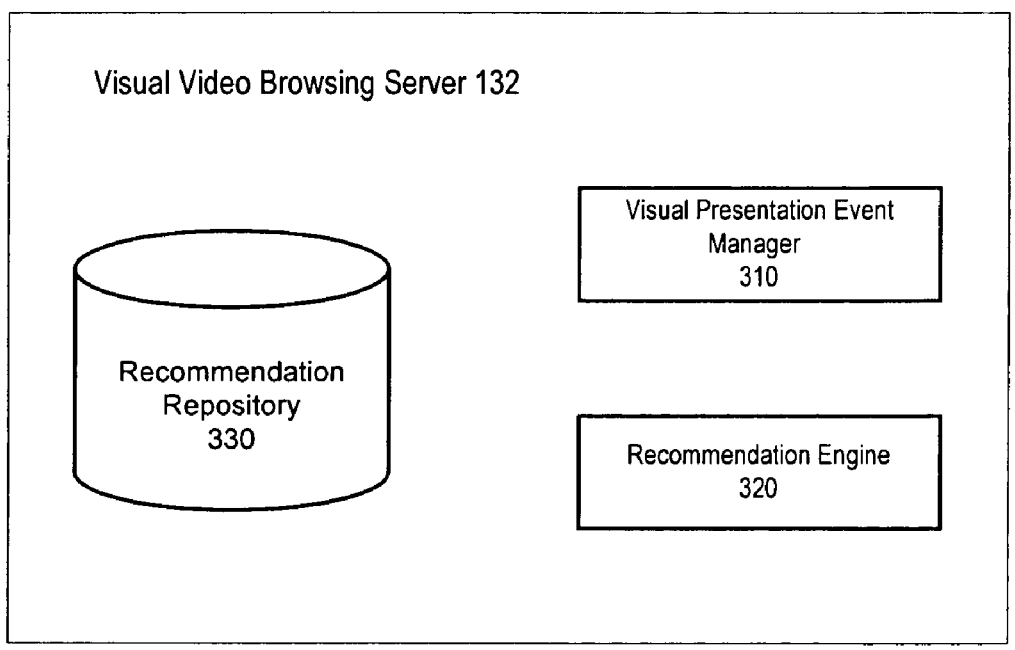
FIG. 3 is a block diagram illustrating modules within a visual video browsing server according to one embodiment.

FIG. 3 is a block diagram illustrating modules within a visual video browsing server 132 according to one embodiment. In one embodiment, the visual video browsing server 132 includes a visual presentation event manager 310, a recommendation engine 320 and a recommendation repository 330. Other embodiments can have different and/or additional modules than the ones shown in the figure. In addition, the functions can be distributed among the modules in a different manner than is described here.

The visual presentation event manager 310 is configured to monitor visual presentation events. One group of the visual presentation events is related to user interface events, such as mouse movements, keyboard inputs, user selections and updates to the display 218. Another group of the visual presentation events is generated by the recommendation engine 320. The event manager 310 is also configured to instruct the recommendation engine 320 to calculate recommendations based on user interface events, receive the recommendations from the recommendation engine 320, and visually present the recommendations to the user. In one embodiment, the recommendation engine 320 generates recommendations at a speed in relation to the video frame rate of currently selected central video. For example, the frame rate of the currently selected central video is 15 frames per second. The recommendation engine 320, in one embodiment, generates recommendations every 5 minutes. In another example, the currently selected central video is 60 frames per second, the recommendation engine 320 may generates recommendations every 2 minutes. In another embodiment, the recommendation engine 320 generates recommendations upon the instructions from the visual presentation manager 310. For each group of recommendations generated, the recommendation engine 320 notifies the visual presentation manager 310 and stores the recommendations in the recommendation repository 330.

Videos in a video repository such as the video database 138 in the website 130 can be related by the recommendation engine 320 in various ways. For example, the recommendation engine 320 may relate various videos based on video content and/or a user's specific interests or past behavior.

In one embodiment, the recommendation engine 320 relates videos using a weighted covisitation measure, and generates a recommendation score for each orbiting video around a central video based on the weighted covisitation measure. The recommendation score of an orbiting video represents a conditional probability of being watched next given the central video being watched. The term "covisitation" in the context of this description refers to an event in which a video watched by a viewer is also watched by other viewers. For example, in a covisitation for A and B, a user watches video A, and then video B. The number of covisitations of videos A and B is then 1, since they are watched by just one user. The recommendation score of video B being watched next given video A being watched is equal to the ratio of number of covisitation of both videos A and B to the number of covisitation of video A, which is 1 in this example. For a single user case as above, the recommendation engine 320 calculates the recommendation score of video B using the equation (1) below:

$$\text{score}(\text{video}_B) = \frac{\text{num\_co}(\text{video}_A \cap \text{video}_B)}{\text{num\_co}(\text{video}_A)} \quad (1)$$

where score($\text{video}_B$) is the recommendation score of video B; num_co($\text{video}_A \cap \text{video}_B$) represents the number of covisitation of both videos A and B; num_co($\text{video}_A$) is the number of covisitation of video A.

In a video hosting website 130 like YOUTUBE, a video is often watched by tens of thousands of viewers, i.e., a large number of covisitations of the video. To take such potentially large number of viewers into consideration when calculating the recommendation score of video B, the recommendation engine 320 weights the number of covisitations of video A by a scaling factor. For example, 1000 viewers watch video A, then B. Thus, the number of covisitations of both videos A and B is 1000, but the number of covisitation of video A, i.e., 1000, is weighted by a scaling factor of 0.6. The scaled recommendation score for video B is above 15, which is much larger than 1 without scaling. The recommendation engine 320 calculates the scaled recommendation score described above using equation (2) below:

$$\text{score}(\text{video}_B) = \frac{\text{num\_co}(\text{video}_A \cap \text{video}_B)}{\text{num\_co}(\text{video}_A)^\lambda} \quad (2)$$

where $\lambda$ is the scaling factor. In one embodiment, $\lambda$ is set to 0.6. In other embodiments the scaling factor is adjusted to an appropriate value for the application. Furthermore, the recommendation engine 320 may also generate recommendation scores based on other factors, such as the length of the video actually watched, length of the video being recommended, and difference in reviewing time between the central video and its orbiting video being measured, etc. For example, a video being recommended is 1 minute long, and a user actually watches 50%, i.e., 30 seconds, of the video at time t2, while the user watches the central video at t1. The recommendation engine 320, in one embodiment, may take above factors into consideration when calculating recommendations.

Now referring back to FIG. 5, the orbiting videos 512 displayed in the display window 500 are not only related to the central video 510, but also correlated with each other. Such relative correlation is displayed by the relative distance towards each other in the display window 500. Each orbiting video 512 possesses two types of force, i.e., a pulling force and a repelling force, towards another orbiting video 512. These two types of force of an orbiting video 512 together determine its relative position in the display window 500 towards other orbiting videos 512. The pulling force between two orbiting videos 512 pulls the orbiting videos 512 towards each other. The strength of that pulling force is proportional to the recommendation scores of the orbiting videos 512 given the central video 510. The recommendation engine 320 calculates the pulling force of the orbiting videos 512 based on their recommendation scores.

Each orbiting video 512 of a group of recommended videos also has a repelling force towards other orbiting videos 512 in the group. The repelling force pushes the orbiting video 512 away from other orbiting videos 512. The repelling force drops off with the square of distance between two orbiting videos 512. In one embodiment, the recommendation engine 320 weights such pulling force and repelling force among them to calculate the relative correlation among the orbiting videos 512. In one embodiment, the visual presentation event manager 310 receives a group of recommended videos including a central video 510 and its orbiting videos 512. Each of the orbiting video 512 has its recommendation score and its relative distance towards the central video 510 and towards other orbiting videos determined by the recommendation engine 320. The event manager 310 displays the group of recommendations with the central video 510 centered in the display window 500 and its orbiting videos 512 orbiting at their respective distances from the central video 510 and from each other. In one embodiment, the event manager 310 uses a script language, such as Javascript, to generate the updated display window 500 with the recommendations.

In one embodiment, the visual presentation event manager 310 is activated upon a user launching his/her web browser 112. In one embodiment, the event manager 310 generates a page that visually displays a default group of video recommendations that move in accordance with the factors described above. The initial central video of the default group of recommendations can be chosen from various resources. In one embodiment, the visual presentation manager 310 consults the user information database 136, and chooses the central video from a list of the most recently reviewed videos by the user, or from a favorite list of videos of the user. In other embodiments, the visual presentation manager 310 chooses the most popular video among the videos in the video database 138 as the central video, or chooses the central video from an arbitrary list. The visual presentation manager 310 then instructs the recommendation engine 320 to generate the recommendations centered on the chosen initial central video, stores the recommendations in the recommendation repository 330, and notifies the visual presentation manager 310. The visual presentation manager 310 visually displays recommendations.

A user can change a currently selected central video to a new central video by mousing over one of the orbiting videos currently displayed in the browsing window 500. In response to such mouse movement, the visual presentation event manager 310 instructs the recommendation engine 320 to recalculate a group of video recommendations around the new central video over which the mouse is currently pointing. The visual presentation event manager 310 displays the newly generated group of video recommendations in the same browsing window 500 that currently displays the previous group of video recommendations. In an alternative embodiment, the user clicks on one of the orbiting videos to select a new central video. In one embodiment, the video thumbnails move on the display so that the new central video is in the position occupied by video 510 in the display and they are new orbiting videos around the new central video. The old orbiting videos with their central video are displayed next to the new central video and corresponding orbiting videos towards one horizontal side of the display. In one embodiment, the new central video and corresponding orbiting videos move to the display from the various sides of the display screen and gradually settles in their perspective distances determined by the recommendation engine. In another embodiment, the new video recommendations get displayed right their perspective distances by the presentation event manager 310.

To calculate a new group of video recommendations and display it in the same display area with the previously displayed group(s) of video recommendations, the recommendation engine 320 calculates a recommendation score for each recommended video of the new group with the newly selected central video. The recommendation engine 320 further calculates the relative distance in display among the videos of the new group of recommendations and the ones of the previous groups. Taking two groups of recommendations as an example, in one embodiment, the recommendation engine 320 calculates a recommendation score for each orbiting video of the newly selected central video using equation (2) described above. Based on the recommendation scores, the recommendation engine 320 evaluates the pulling and repelling force between orbiting videos 512 to determine their relative distance from the newly selected central video and from each other. In one embodiment, one or more orbiting videos of the newly selected central video is/are the same video(s) as the ones in the previous group of recommendations. That indicates that the same video(s) is/are recommended by multiple recommendations. In such circumstance, the recommendation score calculation for a multiple-recommended video includes the covisitation data from both central videos and the video itself. For example, if two different orbiting videos are "pulling" on the same video, the orbiting video with higher recommendation score "pulls" the video with larger pulling force. This indicates that the video being pulled has a closer correlation with the orbiting video having larger pulling force than the other pulling orbit video. As a result, the video being pulled is to be displayed closer to the orbiting video with larger pulling force and moves from its current location to its new location. A similar procedure is applicable to larger number of groups of recommendations. The recommendations no longer recommended go off the display screen if the total number of recommendations exceeds the limit threshold for the display.

To avoid overcrowding of a display window by multiple groups of recommendations, in one embodiment, the default maximum number of videos for each group of recommendations is set to 10, and a total number of videos that can be displayed together in a display is 30. In response to reaching the total number of videos limit, the visual presentation event manager 310 automatically discards the videos with the lower recommendations scores from the earliest displayed group of recommendations while keeping the videos from a later group of recommendations in display. In another embodiment, the visual presentation event manager 310 keeps a global order of recommendation scores of videos currently being displayed. In response to reaching the total number of videos limit, the visual presentation event manager 310 automatically discards videos with lower recommendation scores starting with the lowest one among all recommendation scores.

Figure 6:
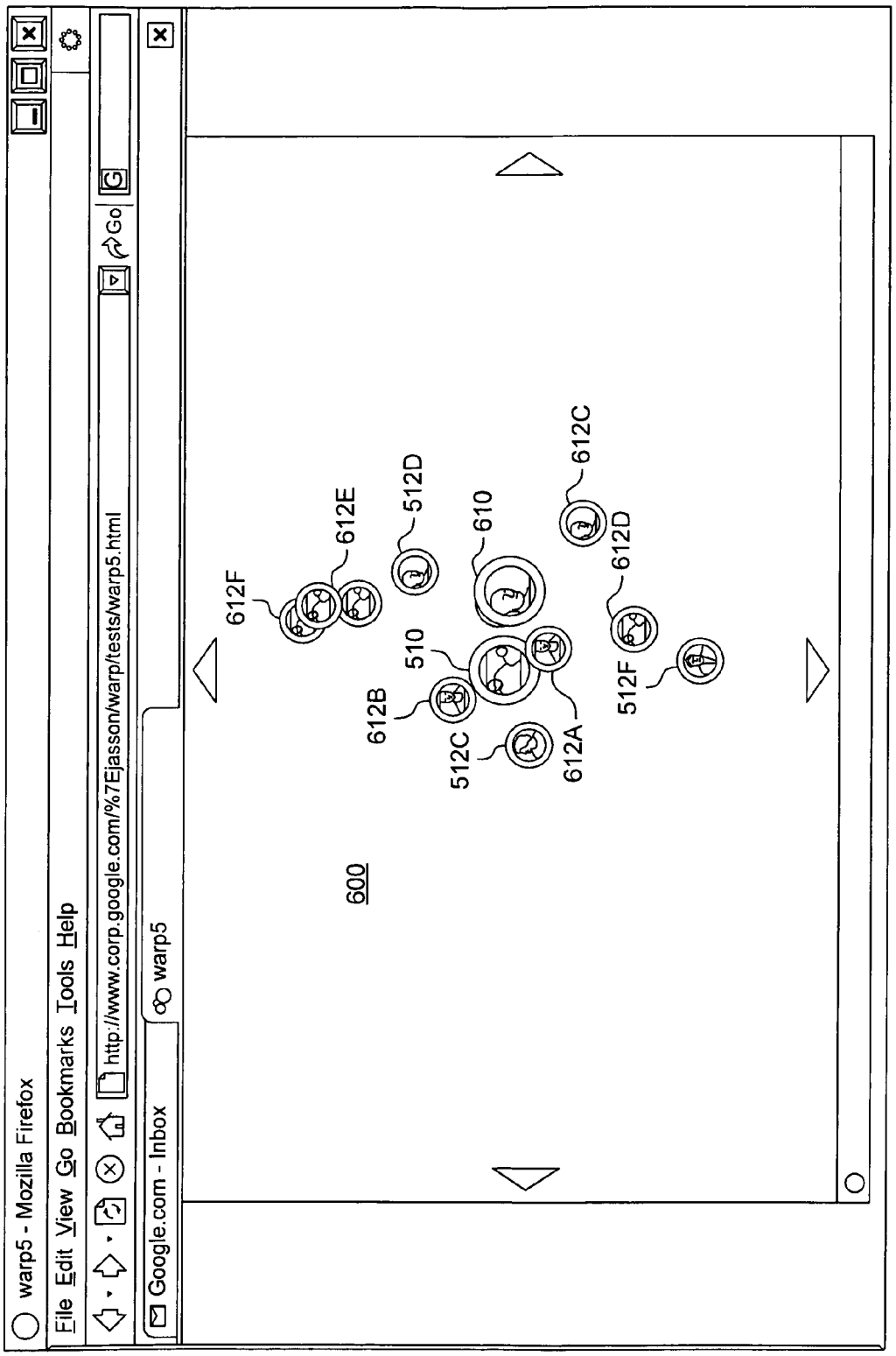
FIG. 6 illustrates a web page implementing an exemplary interface for visually presenting multiple groups of video recommendations in a display area according to one embodiment.

Turning now to FIG. 6, FIG. 6 illustrates a web page implementing an exemplary interface of visually presenting two groups of video recommendations in the same display area 600 according to one embodiment. The two groups of recommendations are displayed using different reference numbers for clarity of illustration. For example, the central video of the first group of recommendations is 510 and its orbiting videos are 512$s$, 512A-512F. The central video of the new group of recommendations is 610 and its orbiting videos are 612$s$, 612A-612F. In this circumstance, the first group of recommendations is first displayed in the display area 600. Its central video 510 is centered in the display area 600 and its orbiting videos 512$s$ are orbiting around it according to their relativity to the central video 510 and their correlation toward each other.

The user of browsing the first group of recommendations later changes his/her interest by mousing over to his/her new interest, i.e., 610, which becomes the central video of the second group of recommendations. The recommendation engine 320 calculates the recommendation score for each orbiting videos 612$s$ using equation (2) with respect to the central video 610. For multiple-recommended orbiting videos 612$s$, the recommendation engine 320 calculates its recommendation score as described above. As a result, the second group of recommendations is displayed as illustrated in FIG. 6. It is noted that the visual presentation event manager 310 displays the newly selected central video 610 in a larger video icon than its orbiting videos, 612A-612F.

Figure 4:
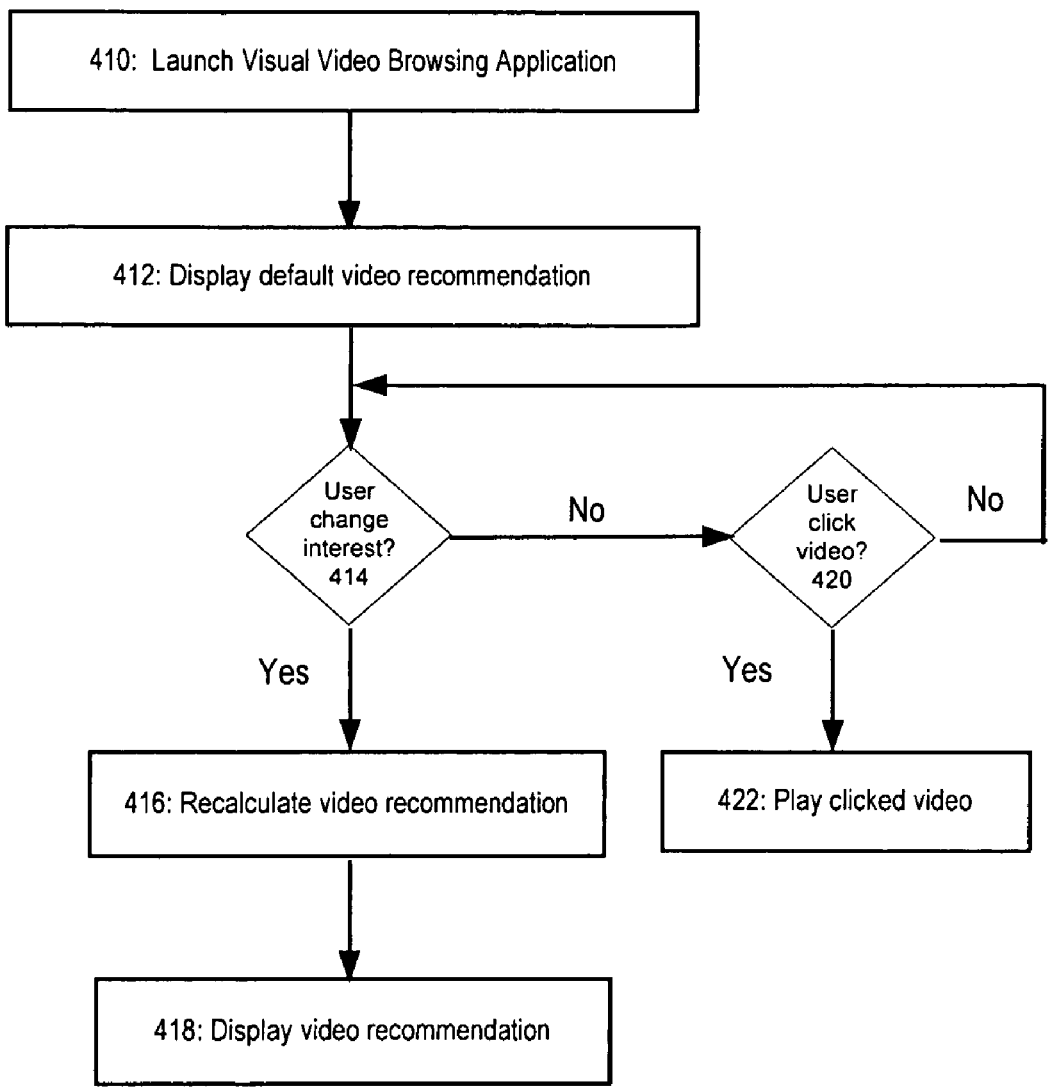
FIG. 4 is a process flow for providing visual presentation of browsing video recommendations according to one embodiment.

FIG. 4 is a process flow of providing visual presentation of browsing video recommendations according to one embodiment. Other embodiments perform different and/or additional steps than the ones described here. Moreover, other embodiments perform steps in different orders.

Initially, the system launches 410 the visual video browsing application when a user logs into the system. The system displays 412 a group of default video recommendations by the visual presentation event manager 310. The default central video is selectable from a variety of video sources, such as the user's favorite list of videos. A recommendation video is related to the central video based on its recommendation score, and is further related to other videos of the group. The visual presentation event manager 310 displays the recommended videos at their corresponding display distance from the central video and from each other. The visual presentation event managers monitors 414 the user event such as user mousing over a video different than the current central video. In response to user changing the current central video, the visual presentation event manager 310 instructs the recommendation engine 320 to recalculate 416 the group of video recommendations around the newly selected central video. The visual presentation event manager 310 displays 418 the newly calculated group of recommendations in the display area together with previously displayed videos. In response to user clicking 420 a video for playing, the visual presentation event manager 310 instructs the video server 134 to retrieve the selected video from the video database 138, and streams the selected video for the user to play 422. Some embodiments may pre-fetch videos to reduce latency time for video loading.

Figure 7:
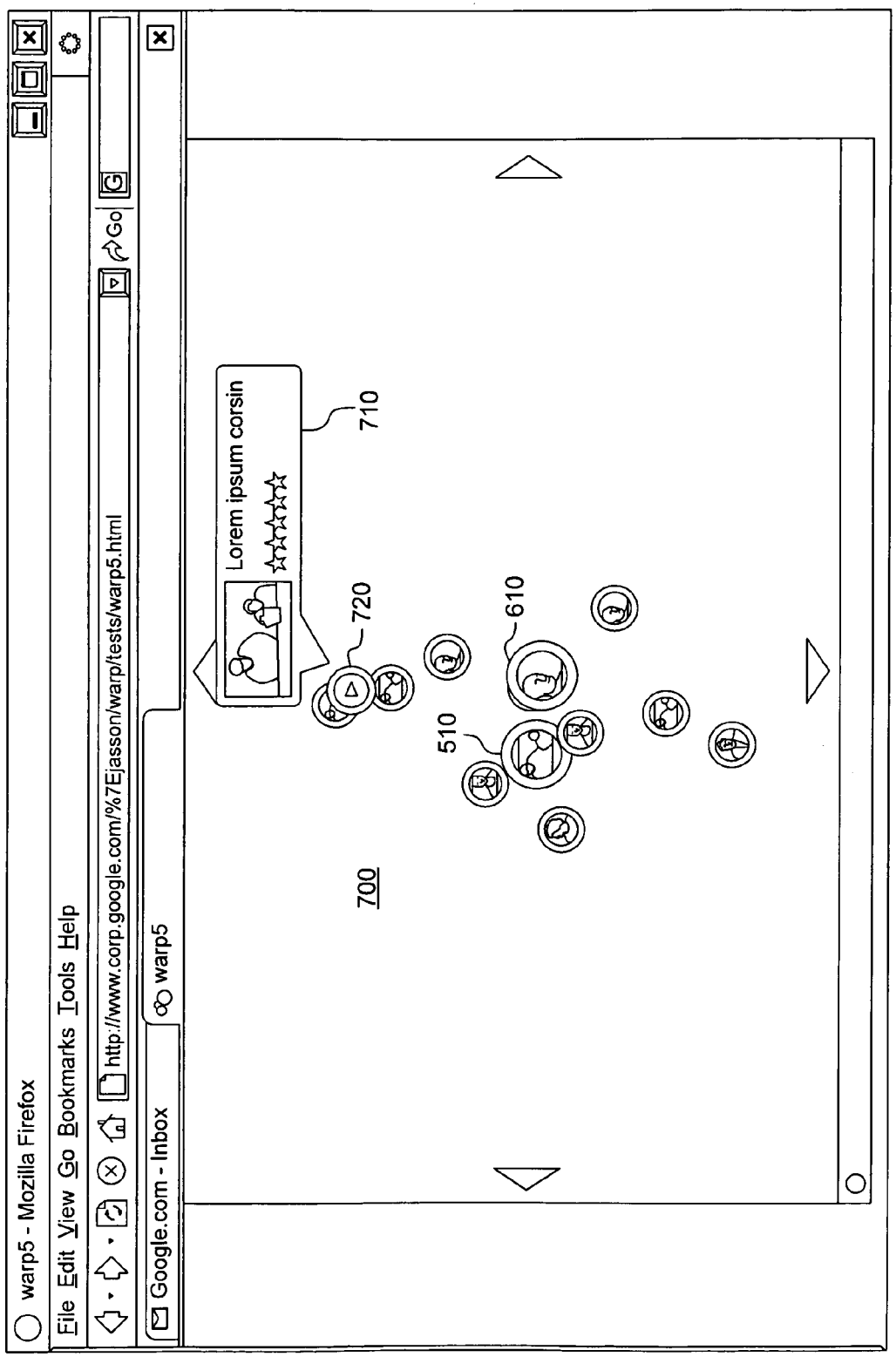
FIG. 7 illustrates a web page implementing an exemplary interface in a ready-to-play mode of operation according to one embodiment.

As mentioned above, in addition to visually presenting video recommendations for users to browse, system 130 also allows a client to select a video and play the selected video. FIG. 7 illustrates a web page implementing an exemplary interface of the system in a ready-to-play mode of operation according to one embodiment. The interface includes a browsing window 700 and two groups of video recommendations with their central videos 510 and 610, respectively. The two groups of recommendations presents visually the browsing activities described in FIG. 5 and FIG. 6. The interface also includes an explanation banner 710 and a play button symbol 720 associated with the selected video. The explanation banner 710 provides more content information including a larger thumbnail image of the key frame of selected video, a title and rating (i.e., the five star symbols). The play button symbol 720 indicates the system 130 is ready to play the selected video for the user. In one embodiment, the play button changes from a thumbnail of the video to a "play" indicator, such as the play button symbol 720 shown when the user mousse over the video thumbnail. Explanation banner 710 also appears in response to a mouseover or other selection indication. When the user clicks the play button 720 (or otherwise indicates a desire to play the selected video), the system 130 instructs the video server 134 to locate the user selected video from the video database 138 and starts streaming the selected video to the client 110. Some embodiments may preload videos to reduce latency.

Figure 8:
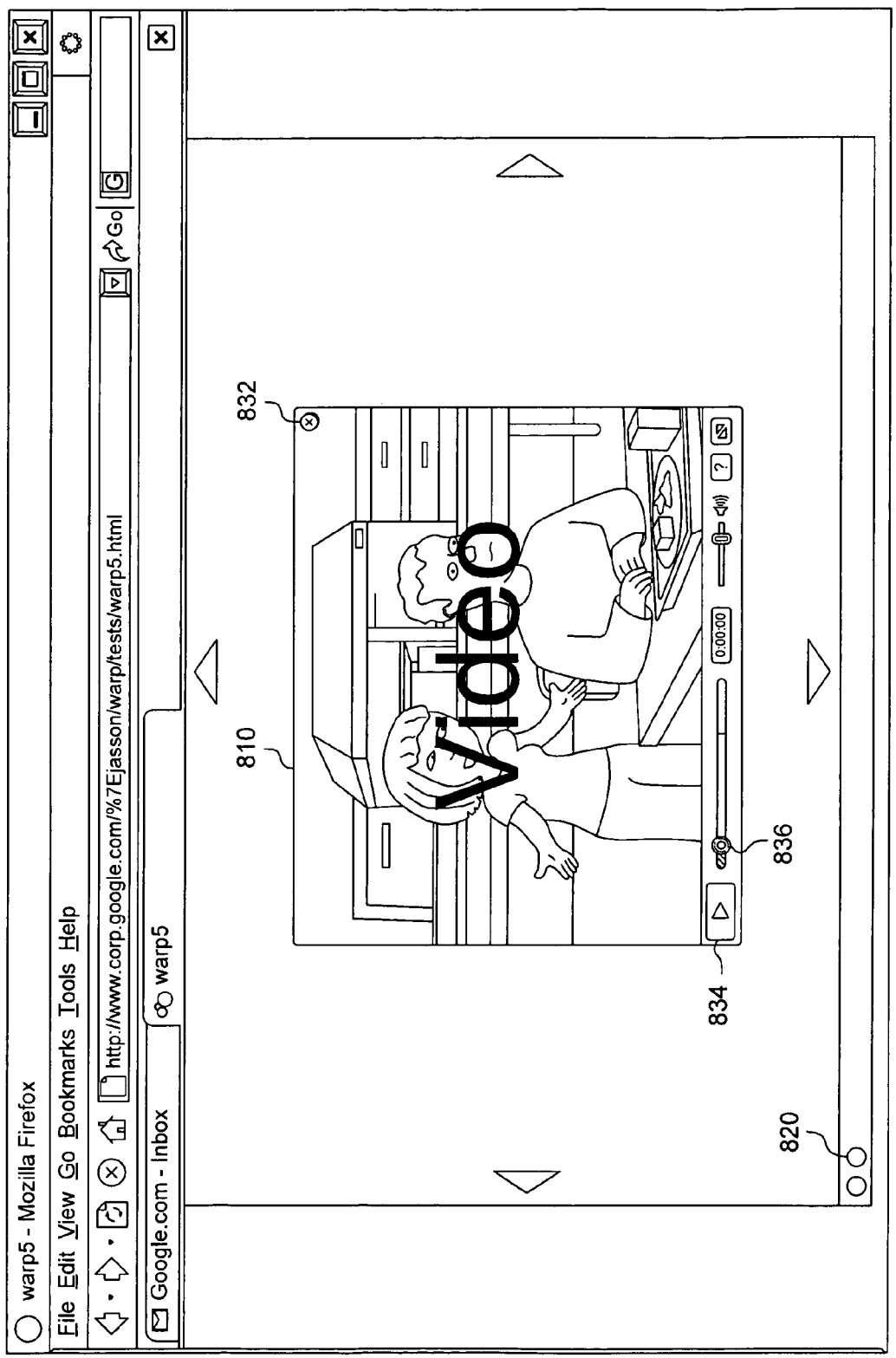
FIG. 8 illustrates an exemplary interface for playing a selected video according to one embodiment.

FIG. 8 illustrates an exemplary interface for playing a selected video according to one embodiment. The interface includes a video player display window 810 showing the video currently being played, a type of service indicator 820 (in this circumstance, it is a streaming service), the player's play button 834, a progress indicator 836 and close button 832.

Figure 9:
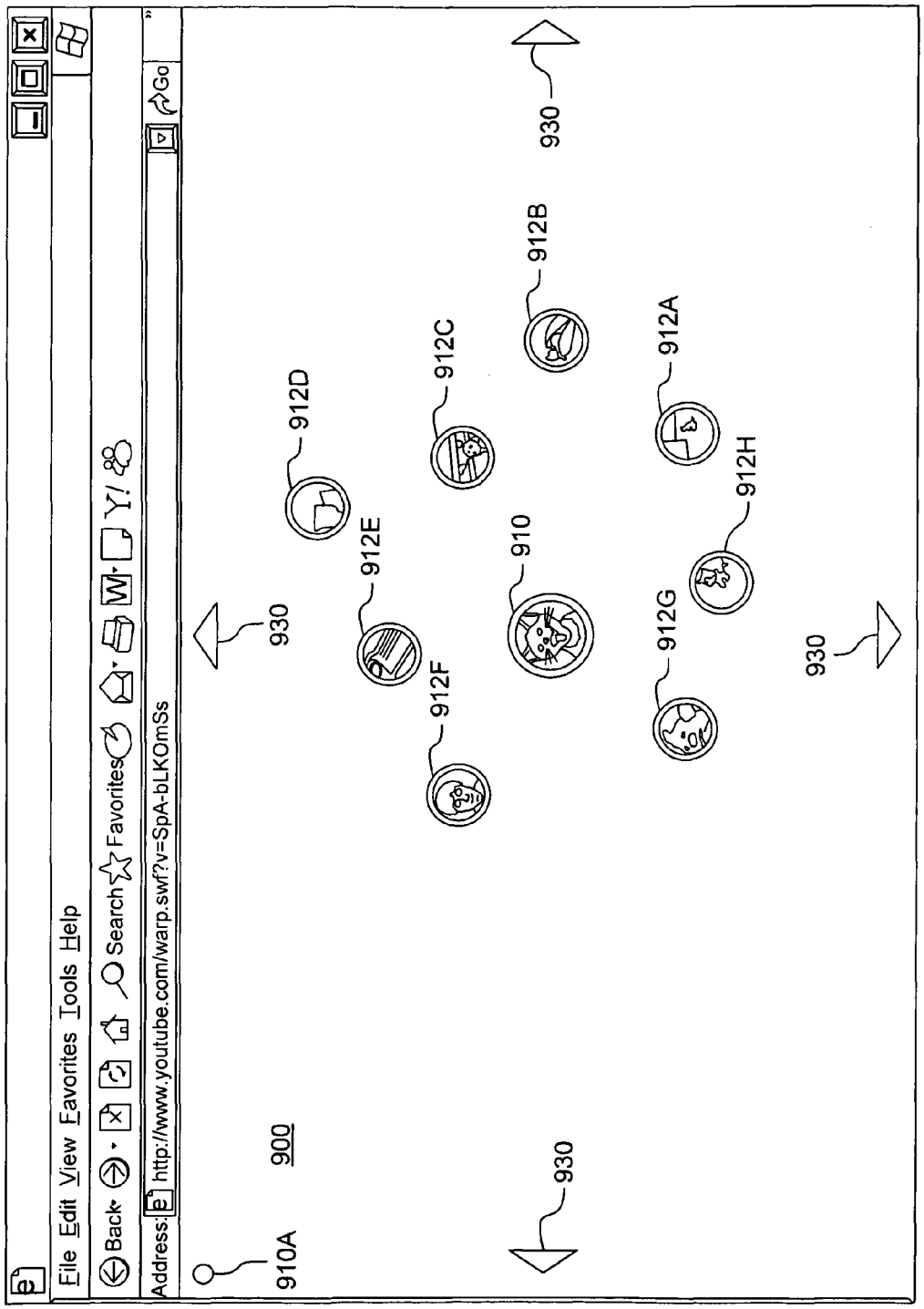
FIG. 9 illustrates a web page implementing an exemplary interface for visually presenting a single group of video recommendations with an indicator of current video of interest in a display area according to another embodiment.

To enhance the user's video browsing experience, the visual video browsing server 132 visually displays video recommendations with an indicator of a current video of interest. FIG. 9 illustrates a web page implementing an exemplary interface for visually presenting a single group of video recommendations with an indicator of current video of interest in a display area according to an embodiment. The exemplary interface includes a video recommendation browsing/display window 900, a group of video recommendations including a central video 910, i.e., the current video of interest, directional display controls 930 and an indicator of the current video of interest 910A. In the illustrated case, the indicator of video of interest 910A corresponds to the central video 910.

Similar to the illustration of FIG. 5, FIG. 9 shows a total of nine videos recommendations and each recommended video is represented by a video icon. The video icon is a thumbnail image of a key frame to give an overview of the visual content in the recommended video. A relatively large video icon of the current central video 910 is displayed at the center of the display window 900. Eight smaller video icons, 912A-912H, each of which represents a recommended video 912 related to the central video 910, (e.g., orbiting videos of the central video 910), are displayed surrounding the central video 910 at its respective distance from the central video 910. For each orbiting video 912 of the central video 910, its displayed distance from the central video 910 represents a probability of being watched next given the current central video 910 being watched, further influenced by its correlation to other orbiting videos 912. As such, the relativity of each orbiting video 912 to the central video 910 is visually displayed in terms of its physical distance from the central video 910 in the display window 900. At the same time, the relative correlation between each orbiting video 912 is also visually displayed in terms of the relative distance between them. Each orbiting video 912 has a probability of being watched next given the central video 910 being watched. The conditional probability associated with each orbiting video 912 is calculated by the recommendation engine 320 of the visual video browsing server 132. Different from FIG. 5, the exemplary interface for visually presenting a single group of video recommendations in FIG. 9 also includes an indicator 910A of the current video of interest, which corresponds to the current central video 910. To further relate the indicator 910A with the current central video 910, in one embodiment, the color of the indicator 910A is same as the color of the video icon of the current central video 910.

As described above, a user can change a currently selected central video to a new central video by mousing over one of the orbiting videos currently displayed in a browsing window. Each central video represents a video of interest selected by the user. In response to such mouse movement, the visual presentation event manager 310 instructs the recommendation engine 320 to recalculate a group of video recommendations around the new central video over which the mouse is currently pointing. The visual presentation event manager 310 displays the newly generated group of video recommendations in the same browsing window that currently displays the previous group of video recommendations. To capture the change of the central videos selected by the user over a time period, the visual presentation event manager 310 displays a line linking the previously selected central video to the currently selected central video, where the line represents the user viewing path. The line may be colored or otherwise highlighted for improved visibility. To facilitate user traversal of the video recommendations generated along the user's view path, the visual presentation event manager 310 also displays a plurality of indicators of video of interest arranged in an order corresponding to the user viewing path. In one embodiment, the plurality of indicators of video of interest is displayed at the top left corner of the browsing window. Further detail on visually displaying the indicators of video of interest is presented in connection with the discussion of FIG. 10.

Figure 10:
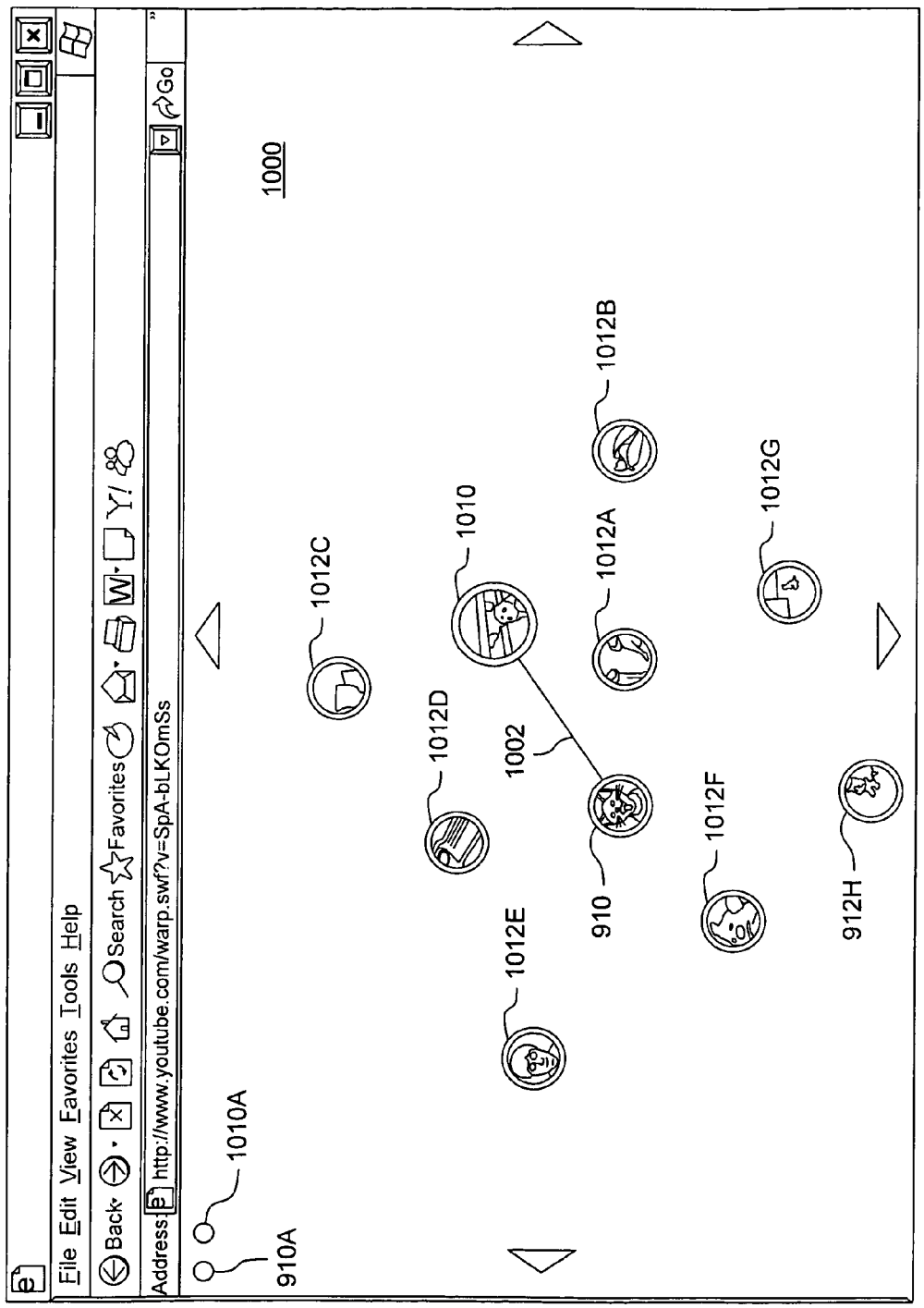
FIG. 10 illustrates a web page implementing an exemplary interface for visually presenting two groups of video recommendations in a display area with a user viewing path and indicators of videos of interest corresponding to the user viewing path according to one embodiment.

FIG. 10 illustrates a web page implementing an exemplary interface for visually presenting two groups of video recommendations together with a user's viewing path and indicators of videos of interest corresponding to the user's viewing path. Specifically, responding to the change of central video from the previous central video 910 to the current central video 1010, which was the orbiting video 912C of the previous central video 910, the visual presentation event manager 310 instructs the recommendation engine 320 to recalculate a group of video recommendations around the new central video 1010. The visual presentation event manager 310 displays the newly generated group of video recommendations in the same display window that currently displays the previous group of video recommendations. To further capture the change of the central videos selected by the user, the visual presentation event manager 310 displays a line 1002 linking the previous central video 910 with the current central video 1010, and presents an indicator 1010A of the current video of interest next to the indicator 910A at the top left corner of the display area.

In one embodiment, the recommendation engine 320 keeps track of the central videos selected by the user in a data structure, such as a linked list, or an array. For each newly selected central video, a corresponding element is added into the data structure and is marked as the current element of the array. Taking FIG. 10 as an example, an array of central videos currently has one element for the current central video 910. Responsive to the newly selected central video 1010, the recommendation engine 320 adds a new element for the central video 1010 in the array. The recommendation engine 320 recalculates the video recommendations with the newly selected central video 1010. The visual presentation event manager 310 gets the newly generated video recommendations and the array of central videos, displays the video recommendations and draws a line between the previous central video 910 and the current central video 1010. To update the indicators of videos of interest in response to the change of the central video, the visual presentation event manager 310 draws the indicator 1010A at the top left corner next to the indicator 910A. The order between 910A and 1010A, i.e., 1010A following the 910A, corresponds to the order of elements being added in the array of central videos.

Line 1002 represents the user's viewing path from the previous central video 910 to the current central video 1010. To differentiate the current central video 1010 from the previous central video 910, in one embodiment, the current central video 1010 is displayed with a larger video icon than the previous central video 910 and in a different color than the previous central video 910. The indicator of the current video of interest 1010A corresponds to the current central video 1010 and is displayed next to the indicator of the previous video of interest 910A at the top left corner of the display window 1000. To differentiate the indicator of the current video of interest 1010A from the indicator of the previous video of interest 910A, the indicator 1010A uses a different color than the indicator 910A. To further relate the indicator 1010A with the current central video 1010, the color of the indicator 1010A is same as the color of the video icon of the current central video 1010. In alternative embodiments, other forms may be used to indicate correspondence between indicators and videos, for example, shape, shading, etc.

To calculate a new group of video recommendations and display it in the same display area with the previously displayed group(s) of video recommendations, the recommendation engine 320 calculates a recommendation score for each recommended video of the new group with the newly selected central video. The recommendation engine 320 further calculates the relative distance in display among the videos of the new group of recommendations and the ones of the previous groups. The visual presentation event manager 310 displays the newly generated group of video recommendations in the same display window that currently displays the previous group of video recommendations. In one embodiment as illustrated in FIG. 10, the new group of video recommendations including the new central video 1010 and its corresponding orbiting videos 1012 move to the display window 1000 from the various sides of the display screen and gradually settle at their respective distances determined by the recommendation engine 320. The new central video 1010 is displayed at the center of the display area 1100. The orbiting videos 1012 of the current central video 1010, except the orbiting video 1012A, are same as the orbiting videos 912 of the previous central video 910, except for the orbiting video 912H because of the high probability that the same videos in the two groups of video recommendations are to be watched even if with different central videos 910 and 1010. To differentiate the previous group of video recommendations from the current one, the visual presentation event manager 310 presents different groups of video recommendations with different colors. For example, in one embodiment, the orbiting video 912H of the previous central video 910 maintains its original green color, while the other orbiting videos 1012 of the current central video 1010 are in brown color. The previous central video 910 becomes an orbiting video of the current central video 1010 and it is displayed in the same color, e.g., brown, as the rest of the orbiting videos 1012 of the current central video 1010.

Figure 11:
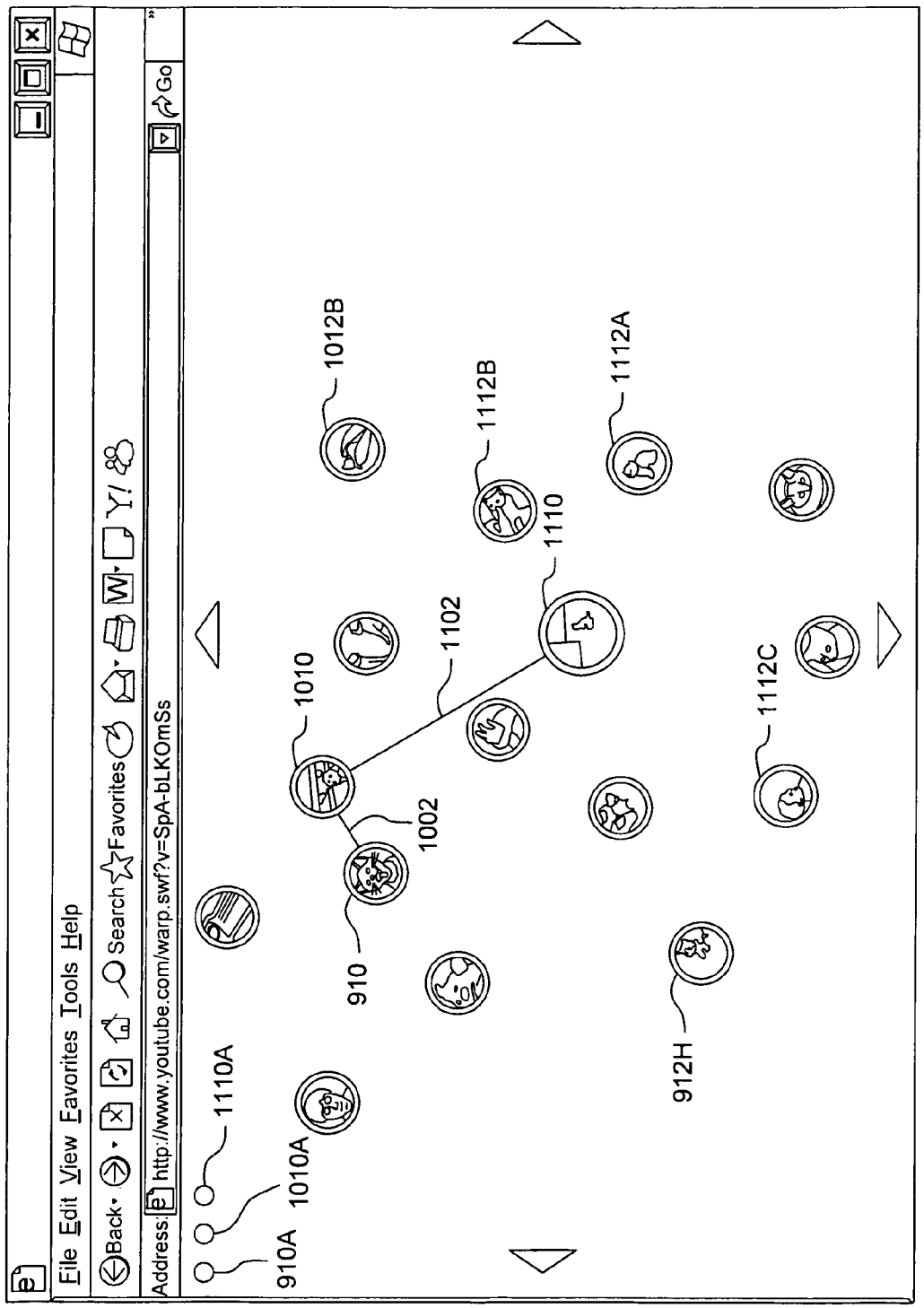
FIG. 11 illustrates a web page implementing an exemplary interface for visually presenting three groups of video recommendations with a user viewing path and indicators of videos of interest corresponding to the user viewing path in a display area according to one embodiment.

FIG. 11 illustrates a web page implementing an exemplary interface for visually presenting three groups of video recommendations with a user viewing path and indicators of videos of interest in a display area according to one embodiment. In FIG. 11, the user has changed the video of interest, i.e., the central video from the previous central video 1010 to the current central video 1110. Responsive to the change of the video of interest, the recommendation engine 320 recalculates the group of video recommendations with the new central video 1110 and the visual presentation event manager 310 displays the group of video recommendations with the new central video 1110 at the center of the displaying area 1100. A new line 1102 links the current central video 1110 to the previous central video 1010, which, in turn, links back to the previous central video 910 by the line 1002. The line starting from the central video 910, through the central video 1010, and to the central video 1110 represents the user viewing path. Further, the user viewing path is displayed as a group of indicators of videos of interest at the top left corner of the display screen 1100. For example, the indicator 1110A corresponds to the current central video 1110, the indicator 1010A corresponds to the previous central video 1010, and the indicator 910A corresponds to the previous central video 910. The displaying order of the three indicators, e.g., 910A, followed by 1010A and 1110A, corresponds to the order of videos viewed by the user along the view path represented by the lines.

Each video recommendation displayed in the displaying window 1100 belongs to one of the three groups of video recommendations. In one embodiment, the group membership of a video recommendation is indicated by the color of the video recommendation with respect to the central videos and indicators of the videos of interest. For example, the orbiting videos 1112A-1112C share the same color of the central video 1110, which indicates the orbiting videos 1112A-1112C belong to the group of video recommendations represented by the central video 1110. The orbiting video 912H share the same color as the indicator 910A, which indicates that the orbiting video 912H belongs to the group of video recommendations where its central video is indicated by the indicator 910A.

Figure 12:
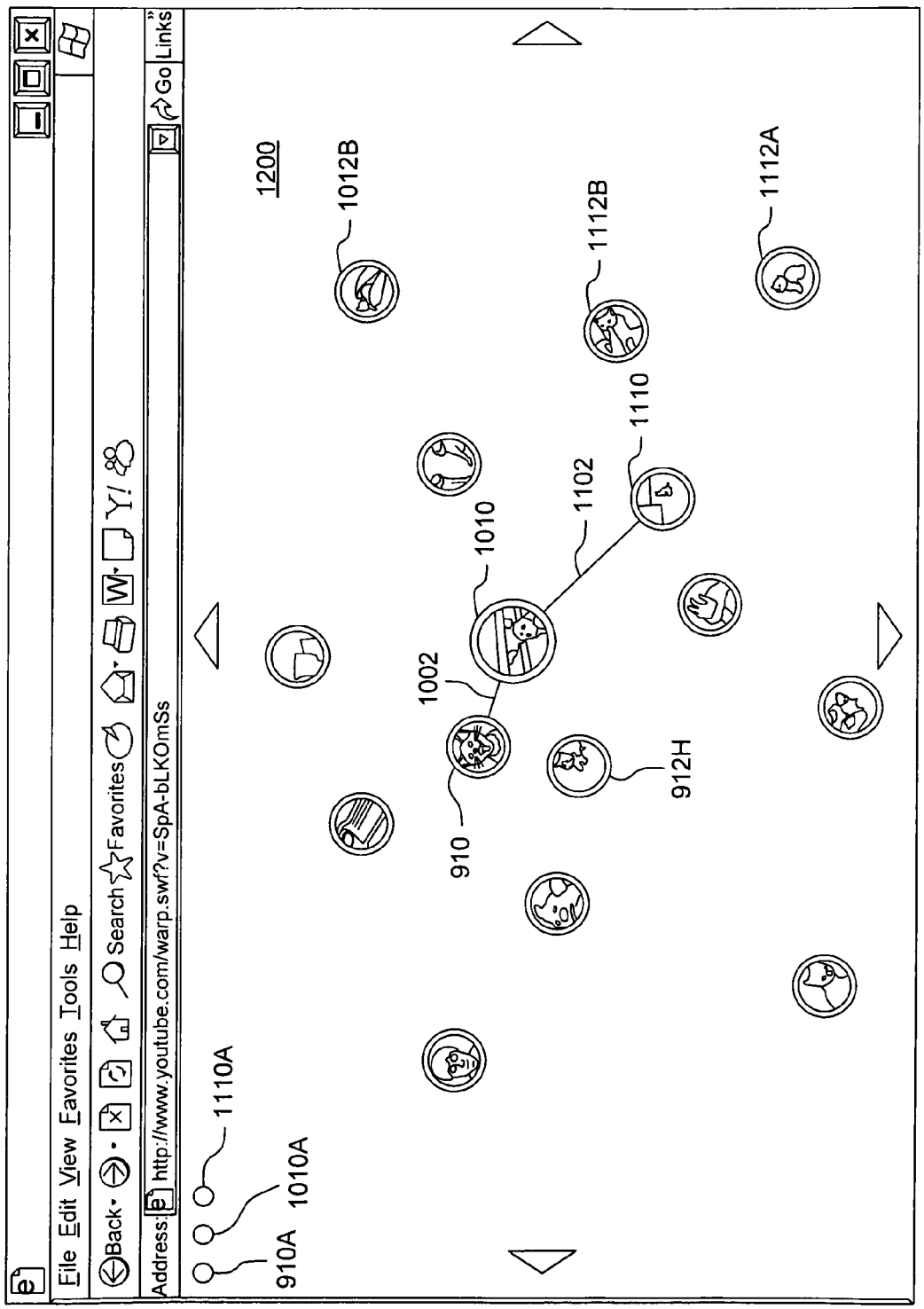
FIG. 12 illustrates a web page implementing another exemplary interface for visually presenting three groups of video recommendations with a user viewing path and indicators of videos of interest corresponding to the user viewing path in a display area according to one embodiment.

FIG. 12 illustrates a web page implementing another exemplary interface for visually presenting three groups of video recommendations with a user viewing path and indicators of videos of interest in a display area according to one embodiment. Compared to the three groups of video recommendations illustrated in FIG. 11, the user has changed the video of interest from the previous central video 1110 in FIG. 11 to the current central video 1010 in FIG. 12, which is displayed at the center of the display window 1200. In one embodiment, the user removes his/her mouse cursor from video 1110 to video 1010. Corresponding to the change of the videos of interest, the recommendation engine 320 recalculates the group of video recommendations with the newly selected video of interest, i.e., video 1010, and the visual presentation event manager 310 displays the current central video 1010 in a larger video icon and at the center of the display window 1200. In another embodiment, the recommendation engine 320 may consult the video database 138 to retrieve the previously calculated group of video recommendations with the video 1010 as the central video. The visual presentation event manager 310 displays the retrieved group of video recommendations with the central video 1010 at the center of the display window 1200.

As described above, an indicator of video of interest corresponds to the current central of video of a group of video recommendations. The display order among a group of indicators represents the order of the videos viewed by a user along the user's viewing path. Additionally, the indicators of videos of interest give the user an alternative way to traverse a plurality of groups of video recommendations. For example, by mousing over the indicator 910A, the recommendation engine 320 recalculates the group of video recommendations with the central video 910A, and the visual presentation event manager 310 displays the newly calculated group of video recommendations in the display window with the central video 910 at the center. In another example, by mousing over the indicator 1010A from the indicator 910A which is previously pointed by a computer mouse, the recommendation engine 320 and the visual presentation event manager 310 responds to the change in real time by generating and displaying the group of video recommendations as described above. Thus, the user video browsing experience is greatly enhanced.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for facilitating user traversing a plurality of groups of video recommendations, comprising:

accessing a first group of video recommendations, each video in the group of video recommendations associated with a recommendation score;

displaying a first video from the first group of video recommendations in a central portion of a display area;

displaying each video in the first group of video recommendations in the display area at a distance from the first video based on its associated recommendation score relative to the first video, and each video in the first group displayed relative to each of the other videos in the first group of video recommendations based upon its recommendation score relative to the recommendation score of each of the other videos in the first group of video recommendations;

receiving a selection of a second video, the second video selected from among the first group of video recommendations; and responsive to the selection of the second video:

generating a second group of video recommendations associated with the second video, each video in the second group of video recommendations associated with a recommendation score and each video selected based its associated recommendation score relative to the second video; and displaying the second central video at the central portion of the display area;

displaying each video in the second group of video recommendations at a distance from the second video based on its associated recommendation score relative to the second video, and each video in the second group displayed relative to each of the other videos in the second group based upon its recommendation score relative to the recommendation score of each of the other videos in the second group of video recommendations;

displaying in the display area the first video at a distance away from the second video based on it associated recommendation score relative to the recommendation score of the second video;

displaying each video in the first group of video recommendations at a distance away from the first video based on its associated recommendation score relative to the recommendation score of the first video, and each video in the first group displayed relative to each of the other videos in the first group of video recommendations based upon its recommendation score relative to the recommendation score of each of the other videos in the first group of video recommendations; and displaying a connection between the first video and the second video.

2. The method of claim 1, wherein displaying the first group of video recommendations comprises displaying an indicator of the first video in the display area, wherein the indicator of video of interest corresponds to the first video.

3. The method of claim 1, wherein the first video is visually connected to the second video by a first line.

4. The method of claim 1, further comprising:
receiving a selection of a third video from among the video recommendations displayed in the display area; and
responsive to the selection of the third video:
generating a third group of video recommendations, wherein the third video is associated with the third group of video recommendations; and
coordinating a visual display of the first group of video recommendations, the second group of video recommendations and the third group of video recommendations in the display area, wherein the second video is visually connected to the third video.

5. The method of claim 4, wherein the second video is visually connected with the third video by a second line.

6. The method of claim 1, wherein generating the second group of video recommendations comprises:
relating a video of the second group of video recommendations to another video of the group based on a correlation between the videos, the correlation being determined by pulling and repelling forces between the videos,
relating a video of the group of video recommendations to the second video associated with the group using a weighted covisitation measure; and
generating a recommendation score for the video based on the weighted covisitation measure.

7. The method of claim 6, wherein a pulling force of a first video towards a second video measures the relative relatedness between the videos, the pulling force of a video being proportional to the recommendation score of the video.

8. The method of claim 6, wherein a repelling force of a first video towards a second video measures the relative unrelatedness between the videos, the repelling force of a video being proportional to the recommendation score of the video.

9. The method of claim 6, wherein generating a recommendation score of a video comprises calculating a probability of the video being viewed next by a client conditioned on a selected video being viewed.

10. The method of claim 9, wherein the probability of the video being viewed next conditioned on the selected video being viewed is $$\text{score}(\text{video}_B) = \frac{\text{num\_co}(\text{video}_A \cap \text{video}_B)}{\text{num\_co}(\text{video}_A)^\lambda},$$

where score($\text{video}_B$) is the recommendation score of video B; num_co($\text{video}_A \cap \text{video}_B$) represents the number of covisitation of both videos A and B; num_co($\text{video}_A$) is the number of covisitation of video A; and $\lambda$ is a scaling factor.

11. The method of claim 1, wherein coordinating the visual display of a plurality of groups of video recommendations comprises:
visually displaying a plurality of video recommendations, wherein the most recently selected video is displayed at the central portion of the display area;
adjusting the respective distance of a video relating to a plurality of selected videos in the display area;
adjusting a plurality of lines connecting a plurality of the selected videos in the display area; and
removing a plurality of video recommendations from the display area in response to a total number of video recommendations to be displayed exceeding a threshold value.

12. The method of claim 11, wherein displaying a plurality of groups of video recommendations comprises displaying a plurality of indicators of a plurality of videos of interest in an order that corresponds to an order in which the plurality of groups of video recommendations were generated.

13. The method of claim 1, further comprising:
selecting an indicator of video of interest from a plurality of indicators displayed in the display area; and
coordinating a visual display of a plurality of groups of video recommendations, wherein the selected video corresponding to the indicator is displayed at the central portion of the display area.

14. A computer system for facilitating user traversal of a plurality of groups of video recommendations, comprising:
a non-transitory computer-readable medium storing executable computer modules, comprising:
a presentation module configured to:
access a first group of video recommendations, each video in the group of video recommendations associated with a recommendation score;
display a first video from the first group of video recommendations in a central portion of a display area;
display each video in the first group of video recommendations in the display area at a distance from the first video based on its associated recommendation score relative to the first video, and each video in the first group displayed relative to each of the other videos in the first group of video recommendations based upon its recommendation score relative to the recommendation score of each of the other videos in the first group of videos;
a receiving module configured to receive from a client computer a selection of a second video, the second video selected from the first group of video recommendations, the receiving module coupled to the presentation module;
a recommendation module configured to:
generate a second group of video recommendations in response to the user selection of the second video, each video in the second group of video recommendations associated with a recommendation score and each video selected based its associated recommendation score relative to the second video, the recommendation module coupled to the receiving module and the presentation module; and
the presentation module further configured to:
display the second video at the central portion of the display area;
display each video in the second group of video recommendations at a distance from the second video based on its associated recommendation score relative to the second video, and each video in the second group displayed relative to each of the other videos in the second group based upon its recommendation score relative to the recommendation score of each of the other videos in the second group of videos;
display in the display area the first video at a distance away from the second video based on it associated recommendation score relative to the recommendation score of the second video;
display each video in the first group of video recommendations at a distance away from the first video based on its associated recommendation score relative to the recommendation score of the first video, and each video in the first group displayed relative to each of the other videos in the first group of video recommendations based upon its recommendation score relative to the recommendation score of each of the other videos in the first group of video recommendations;
display a connection between the first video and the second video; and
a processor configured to execute the computer modules stored by the computer-readable storage medium.

15. The system of claim 14, wherein the presentation module is configured to display an indicator of video of interest in the display area, wherein the indicator of video of interest corresponds to the first video.

16. The system of claim 14, wherein the presentation module is configured to visually connect the first video to the second video by a first line.

17. The system of claim 14, further comprising:
the receiving module further configured to receive a selection of a third video from the video recommendations displayed in the display area; and
the recommendation module further configured to generate a third group of video recommendations, wherein the third central video is associated with the third group of video recommendations responsive to the selection of the third video; and
the presentation module further configured to coordinate a visual display of the first group of video recommendations, the second group of video recommendations and the third group of video recommendations in the display area, wherein the second video is visually connected to the third video.

18. The system of claim 17, wherein the presentation module is configured to visually connect the second video to the third video by a second line.

19. The system of claim 14, wherein the recommendation module is configured to:
relate a video of the group of video recommendations to another video of the group based on a correlation between the videos, the correlation being determined by pulling and repelling forces between the videos;
relate a video of the group of video recommendations to a selected video associated with the group using a weighted covisitation measure; and
generate a recommendation score for the video based on the weighted covisitation measure.

20. The system of claim 19, wherein a pulling force of a first video towards a second video measures the relative relatedness between the videos, the pulling force of a video being proportional to the recommendation score of the video.

21. The system of claim 19, wherein a repelling force of a first video towards a second video measures the relative unrelatedness between the videos, the repelling force of a video being proportional to the recommendation score of the video.

22. The system of claim 19, wherein the recommendation module is configured to calculate a probability of the video being viewed next by a client conditioned on a selected video being viewed.

23. The system of claim 22, wherein the probability of the video being viewed next conditioned on the selected video being viewed is $$\text{score}(\text{video}_B) = \frac{\text{num\_co}(\text{video}_A \cap \text{video}_B)}{\text{num\_co}(\text{video}_A)^\lambda},$$

where score($\text{video}_B$) is the recommendation score of video B; num_co($\text{video}_A \cap \text{video}_B$) represents the number of covisitation of both videos A and B; num_co($\text{video}_A$) is the number of covisitation of video A; and $\lambda$ is a scaling factor.

24. The system of claim 14, wherein the presentation module is configured to:
visually display a plurality of video recommendations, wherein the most recently selected video is displayed at the central portion of the display area;
adjust the respective distance of a video relating to a plurality of selected videos in the display area;
adjust a plurality of lines connecting a plurality of the selected videos in the display area; and
remove a plurality of video recommendations from the display area in response to a total number of video recommendations to be displayed exceeding a threshold value.

25. The system of claim 24, wherein the presentation module is configured to display a plurality of indicators of a plurality of videos of interest in an order that corresponds to an order in which the plurality of groups of video recommendations were generated.

26. The system of claim 14, further comprising:
a user selection of an indicator of video of interest from a plurality of indicators displayed in the display area; and
the presentation module configured to coordinate a visual display of a plurality of groups of video recommendations, wherein the central video corresponding to the indicator is displayed at the central portion of the display area.

27. A non-transitory computer-readable storage medium containing a computer program product for facilitating user traversing a plurality of groups of video recommendations, the computer product comprising:

computer program code for accessing a first group of video recommendations, each video in the group of video recommendations associated with a recommendation score;

computer program code for displaying a first video from the first group of video recommendations in a central portion of a display area;

computer program code for displaying each video in the first group of video recommendations in the display area at a distance from the first video based on its associated recommendation score relative to the first video, and each video in the first group displayed relative to each of the other videos in the first group of video recommendations based upon its recommendation score relative to the recommendation score of each of the other videos in the first group of video recommendations;

computer program code for receiving a selection of a second video, the second video selected from among the first group of video recommendations; and computer program code for, responsive to the selection of the second video:

generating a second group of video recommendations associated with the second video, each video in the second group of video recommendations associated with a recommendation score and each video selected based its associated recommendation score relative to the second video;

displaying the second central video at the central portion of the display area;

displaying each video in the second group of video recommendations at a distance from the second video based on its associated recommendation score relative to the second video, and each video in the second group displayed relative to each of the other videos in the second group based upon its recommendation score relative to the recommendation score of each of the other videos in the second group of video recommendations;

displaying in the display area the first video at a distance away from the second video based on it associated recommendation score relative to the recommendation score of the second video;

displaying each video in the first group of video recommendations at a distance away from the first video based on its associated recommendation score relative to the recommendation score of the first video, and each video in the first group displayed relative to each of the other videos in the first group of video recommendations based upon its recommendation score relative to the recommendation score of each of the other videos in the first group of video recommendations; and displaying a connection between the first video and the second video.

28. The computer program product of claim 27, further comprising:

computer program code for visually displaying a plurality of video recommendations, wherein the most recently selected video is displayed at the central portion of the display area;

computer program code for adjusting the respective distance of a video relating to a plurality of selected videos in the display area;

computer program code for adjusting a plurality of lines connecting a plurality of the selected videos in the display area; and computer program code for removing a plurality of video recommendations from the display area in response to a total number of video recommendations to be displayed exceeding a threshold value.

* * * * *